United States Patent [19]

Shalit

[11] 3,928,473

[45] Dec. 23, 1975

[54] OSMIUM CATALYZED OXIDATION OF OLEFINIC COMPOUNDS

[75] Inventor: Harold Shalit, Drexel Hill, Pa.

[73] Assignee: Atlantic Richfield Company, Los Angeles, Calif.

[22] Filed: Mar. 11, 1974

[21] Appl. No.: 449,889

[52] U.S. Cl. .......................... 260/635 H; 260/533 R
[51] Int. Cl.$^2$ .................... C07C 27/10; C07C 29/02
[58] Field of Search ......... 260/635 H, 637 R, 639 B

[56] References Cited
UNITED STATES PATENTS

| | | | |
|---|---|---|---|
| 2,833,787 | 5/1958 | Carlson et al. | 260/635 H |
| 2,969,275 | 1/1961 | Garrett | 260/637 R |
| 3,011,002 | 11/1961 | Giesen et al. | 260/637 R |
| 3,076,013 | 1/1963 | Lito et al. | 260/635 H |
| 3,202,694 | 8/1965 | Kirshenbaum et al. | 260/639 B |
| 3,317,592 | 5/1967 | Maclean et al. | 260/635 H |

FOREIGN PATENTS OR APPLICATIONS

| | | | |
|---|---|---|---|
| 1,051,874 | 12/1966 | United Kingdom | 260/639 B |
| 210,767 | 1968 | U.S.S.R. | 260/635 H |
| 1,469,464 | 1/1967 | France | 260/365 H |

OTHER PUBLICATIONS

Lange, *Handbook of Chemistry*, 10th ed. (1961), pp. 306,307.

Primary Examiner—Joseph E. Evans
Attorney, Agent, or Firm—Delbert E. McCaslin

[57] ABSTRACT

In the aqueous phase oxidation of olefin to glycols with molecular oxygen in the presence of catalytic amounts of dissolved octavalent osmium catalyst, the addition of borates to the solution materially increases the rate of reaction and permits a higher final glycol concentration to be obtained.

9 Claims, No Drawings

OSMIUM CATALYZED OXIDATION OF OLEFINIC COMPOUNDS

BACKGROUND OF THE INVENTION

The hydroxylation of olefins to produce polyhydric alcohols by means of chlorate solutions containing osmium tetroxide has long been known; see for example, Hofmann, Ber. 45,3329 (1912). The use of peroxides together with osmium tetroxide is also known; see Milas U.S. Pat. Nos. 2,414,385 and 2,437,648, for example. A more recent U.S. Pat. No. 3,317,592 (1967) shows that when olefins are reacted with oxygen in the presence of catalytic amounts of osmium tetroxide dissolved in water at a pH of 8–10, glycols and acids can be produced rather selectively.

When olefins are caused to react with oxygen in the presence of catalytic amounts of octavalent osmium dissolved in water at a pH of 9–11 and at temperatures of 80°C. or above, they form glycols rather selectively, but the rate of reaction is relatively slow and decreases rapidly with time; thus, in a few hours, the reaction is essentially over and the final glycol concentration in solution is relatively low. This is a decided disadvantage since the most expensive component in the system is osmium, and the slower the reaction rate and the lower the final glycol concentration, the greater the amount of osmium that is required to be cycled in the system. Consequently, both osmium inventory as well as make-up are markedly influenced by the reaction rate and final glycol concentration, and therefore these factors also decidedly influence the economics of the process.

The reason or reasons for the decreasing rate and low final glycol concentration is not known, but it is hypothesized that a complex is formed between the glycol produced and the reduced (hexavalent) osmium, which complex is relatively stable to oxidation. Since the oxidation of the olefin depends upon the octavalent osmium, as this ion becomes depleted and, because of the hypothesized stable hexavalent osmium-glycol complex, is not re-formed, the reaction slows and effectively stops at a relatively low glycol yield. This effect is particularly troublesome since, even at low yields, the glycol is present in a very large molar excess over the osmium, so that the tendency is for the hypothesized $Os^{+6}$-glycol complex to be further stabilized.

It now has been found, however, that if borates, in particular the alkali metal borates, are added to the reaction solution, the rate of reaction is materially increased and a considerably higher final glycol concentration is obtained. The reasons for these improvements likewise are not shown. It is relatively certain, however, that there is no formation of perborates since sodium perborate fails to reoxidize $Os^{+6}$ to $Os^{+8}$ and in fact decomposes rapidly in the presence of osmium even at low temperatures, i.e. 40°C. and below, well below reaction temperatures. Irrespective, however, of the mechanism involved in accordance with this invention, borates, particularly the alkali metal borates, increase reaction rates and final glycol yield.

SUMMARY OF THE INVENTION

The method of this invention involves the conversion of $C_2$ to $C_4$ monoolefins, preferably, to produce their corresponding glycols empolying molecular oxygen in the presence of catalytic amounts of osmium, preferably, in the form of dissolved octavalent osmium compounds wherein borates are added to the solution to increase the rate of reaction and permit a higher final glycol concentration to be obtained than is obtained in the absence of the added borate.

It is an object of this invention to provide an improved rate of reaction and yield of glycol in the aqueous phase oxidation of an olefinic compound with molecular oxygen in the presence of an octavalent osmium catalyst.

It is another object of this invention to provide improved rates of reaction and yields of glycol in the aqueous phase oxidation of an olefinic compound with molecular oxygen in the presence of an octavalent osmium catalyst by the addition of a borate.

Other objects of this invention will be apparent from the description of the invention which follows and from the claims.

DESCRIPTION OF THE INVENTION

The olefinic compounds which can be converted to their corresponding glycols by the method of this invention include those having from two to four carbon atoms in the molecule, e.g. ethylene, propylene, allyl alcohol (to glycerol), and the butylenes, in particular, isobutylene. Propylene and isobutylene are particularly useful in the method of this invention.

The osmium catalyst is preferably in a water-soluble form and is octavalent. These octavalent osmium catalysts are well known in the art, and are conveniently prepared by reacting osmium tetroxide ($OsO_4$) with a small excess of a base such as sodium hydroxide in aqueous solution to produce the active "osmate", i.e. the octavalent osmium salt or salts. Other bases can also be used since the particular osmate is not critical. The concentration of osmium in the aqueous solution can vary widely, ranging from 1 part per million to 1 per cent or more. However, as has been pointed out, osmium is a costly material, and accordingly, high concentrations are preferably avoided since they do not give the improvement in results commensurate with their cost. A preferred range of osmium is from 50 ppm to 1000 ppm in the aqueous phase by weight.

The ratio of oxygen to olefinic compound must be outside the explosive limits. If oxygen is in excess, the ratio should be 98 weight percent oxygen or more and 2 percent or less of the olefinic compound. As the other end of the range, wherein the olefinic compound is in large excess, the oxygen concentration of the oxidizing gas should be limited to 10 volume per cent oxygen and 90 volume per cent nitrogen (or similar inert gas) irrespective of the amount of olefinic compound. When oxygen is in excess, olefinic compound can be added during the reaction as the reaction proceeds. On the other hand, where the olefinic compound is in excess, oxygen can be added during the reaction as the oxygen is consumed. The reaction can be carried out from pressures ranging from 1 atmosphere to 10,000 psig; however, pressures ranging from about 800 psig to 1200 psig are convenient.

The reaction temperature ranging from 60°C. to 200°C. are operable. However, a preferred range is from 80°C. to 120°C. since above about 120°C. selectivity for the production of the glycol decreases.

It has been found that higher oxygen partial pressures give somewhat higher reaction rates but not significantly higher yields, and likewise, reaction rates increase with temperature, but as has been pointed out, at temperatures above about 120°C. the increase in rate is offset by a loss in selectivity for the glycol production. The pH of the aqueous solution can vary from 7 to 14, preferably from 7.5 to 13.5, and most preferably from 8 to 11. This can be adjusted by using a buffer solution or by the use of a combination of boric acid and sodium hydroxide in various proportions. The borate complex resulting is a function of the pH of the solution. Other borates can, of course, be employed, for example, the potassium borates, lithium borate and the like. It is necessary that the compounds be sufficiently water soluble to provide an effecitve concentration in the aqueous phase. Some borates such as the calcium compounds are relatively only slightly soluble and therefore are not preferred. The perborates are very unstable in the presence of the osmate catalyst and decompose to give the borate with the evolution of the peroxy oxygen. Thus there is no advantage in employing such compounds. It is most preferable to employ borax itself, i.e., $Na_2B_4O_7 \cdot 10H_2O$, since this gives a solution having a pH of about 9.3 which is almost in the middle of the preferred range and is the most common and least expensive borate compound. The amount of borate, for example borax, can range from 1 percent up to 50 percent but is preferably from 10 to 40 percent by weight of the aqueous solution. It has been found that molten borax alone can be used since it provides sufficient water from the molecules of water of hydration to give an aqueous phase. The amount of aqueous solution or aqueous phase need only be sufficient to provide the necessary hydroxyls in the reaction. It is preferred, however, to provide sufficient aqueous phase such that by agitation as efficient contacting of the liquid and gaseous phases is achieved. The reaction can be carried out either batchwise or continuously; however, in the Examples which follow a batch-type procedure was employed.

The runs in the Examples which follow were all carried out with the olefinic compound and oxygen in a stirred titanium autoclave, 300 cc capacity, at below the lower explosive limit, i.e., 98+ percent molecular oxygen and about 1.1 percent by weight olefin. The total pressure in the bomb was 900 psig, the olefin was added in increments as it was reacted as shown by pressure decrease. The additional increments were added in such a manner that the explosive concentration was not exceeded. In the runs shown, each used 150 cc of an aqueous solution of octavalent osmium catalyst prepared from a small molar excess of sodium hydroxide and osmium tetroxide, such that the solution contained by analysis 710 ppm by weight of osmium. In the comparative runs (2 and 4) wherein borax was not employed, a sodium carbonate-sodium bicarbonate buffer solution was employed to give a pH of about 9.5, corresponding approximately to the pH obtained when borax was used alone without any buffer.

EXAMPLE

The following runs shown in the Table were carried out in the manner described giving the results shown below.

| Run No. | 1 | 2 | 3 | 4 | 5 |
|---|---|---|---|---|---|
| Olefin | Ethylene | Propylene | Propylene | Isobutylene | Isobutylene |
| Borax, Wt. % | 25 | 0* | 25 | 0* | 25 |
| Temperature, °C. | 100 | 100 | 100 | 100 | 100 |
| Time, hours | 3 | 5.5 | 3.5 | 4 | 5 |
| Glycol yield, grams | 6.9 | 4.3 | 8.2 | 17.8 | 43.6 |
| Hydroxyisobutyric acid, grams | 0 | 0 | 0 | 3.6 | 10.1 |
| Rate, grams glycol/hr. | 2.30 | 0.78 | 2.34 | 4.45 | 8.74 |

*3.3 grams sodium carbonate, 1.9 grams sodium bicarbonate to give a pH of 9.5.

The foregoing runs demonstrate the effectiveness of employing a borate to increase both the rate of reaction and the yield of the glycol.

I claim:

1. In the method for the oxidation of monoolefinic compounds having from 2 to 4 carbon atoms in the molecule and selected from the group consisting of ethylene, propylene, allyl alcohol and butylenes at a temperature in the range from 60°C. to 220°C. and a pressure of from 1 atmosphere to 10,000 psig with molecular oxygen in the presence of an octavalent osmium catalyst in aqueous solution to produce the corresponding glycol, the improvement comprising adding from 1 weight percent to 50 weight percent of an alkali metal borate based on the aqueous solution.

2. The method according to claim 1 wherein the osmium concentration in the aqueous solution ranges from 50 ppm to 1000 ppm by weight.

3. The method according to claim 1 wherein the temperature is in the range of 80°C. to 120°C. and the pressure is in the range of from about 800 psig to 1200 psig.

4. The method according to claim 1 wherein the pH of the aqueous solution is in the range of from 7 to 14.

5. The method according to claim 3 wherein the pH of the aqueous solution is in the range of from 8 to 11.

6. The method according to claim 1 wherein the borate is borax having the molecular formula $Na_2B_4O_7 \cdot 10H_2O$.

7. The method according to claim 3 wherein the borate is borax having the molecular formula $Na_2B_4O_7 \cdot 10H_2O$ and the concentration is in the range of from 10 per cent to 40 percent by weight of the aqueous solution.

8. The method according to claim 1 wherein the borate is borax having the molecular formula $Na_2B_4O_7 \cdot 10H_2O$ and is in the molten form to provide the aqueous solution from the water of hydration.

9. A method according to Claim 1 wherein the alkali metal borate is selected from the group consisting of sodium, potassium and lithium borates.

* * * * *